July 10, 1928.
F. A. ANETSBERGER ET AL
1,676,763
HUMIDIFYING APPARATUS
Filed Sept. 12, 1927    3 Sheets-Sheet 2
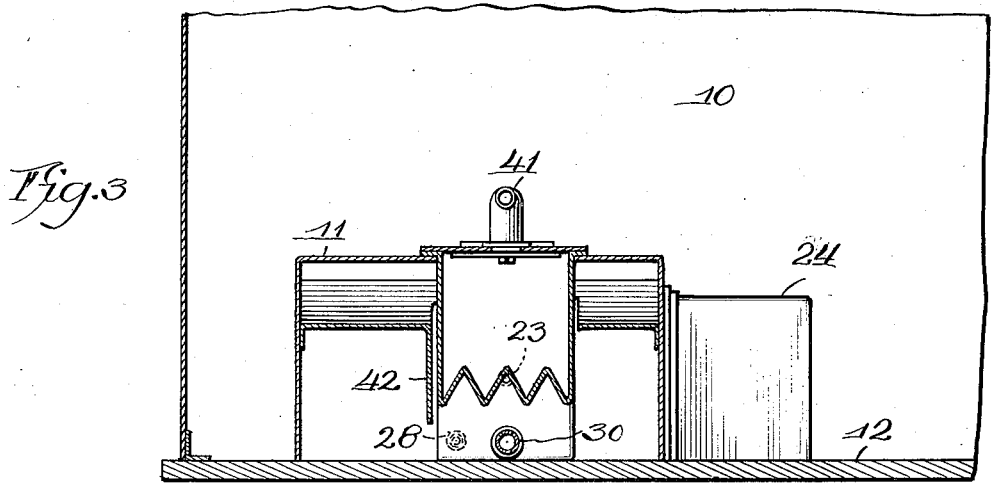
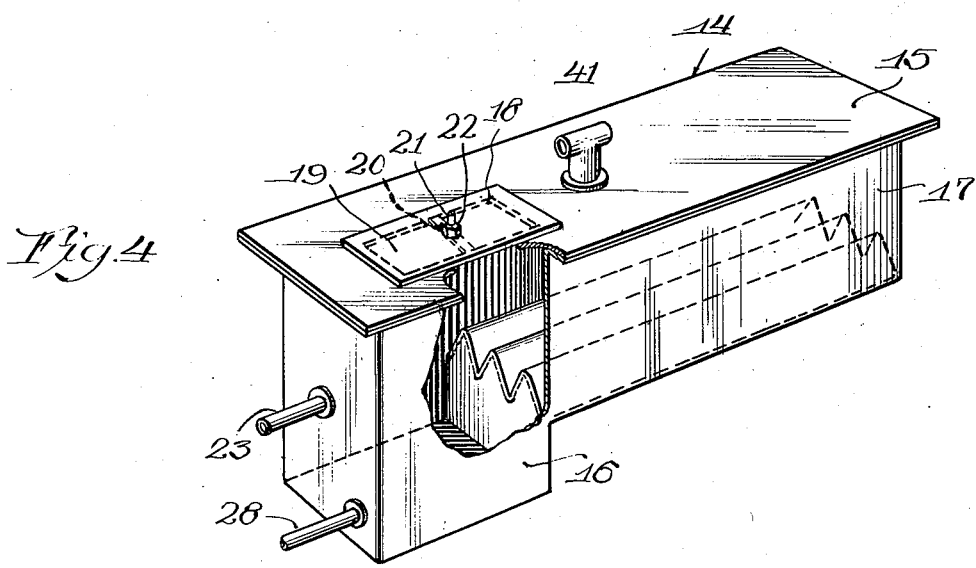
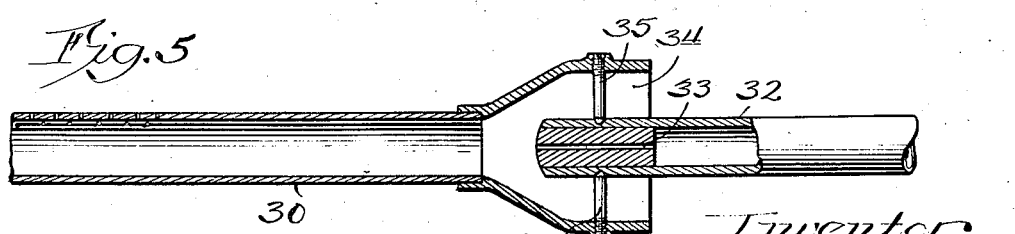

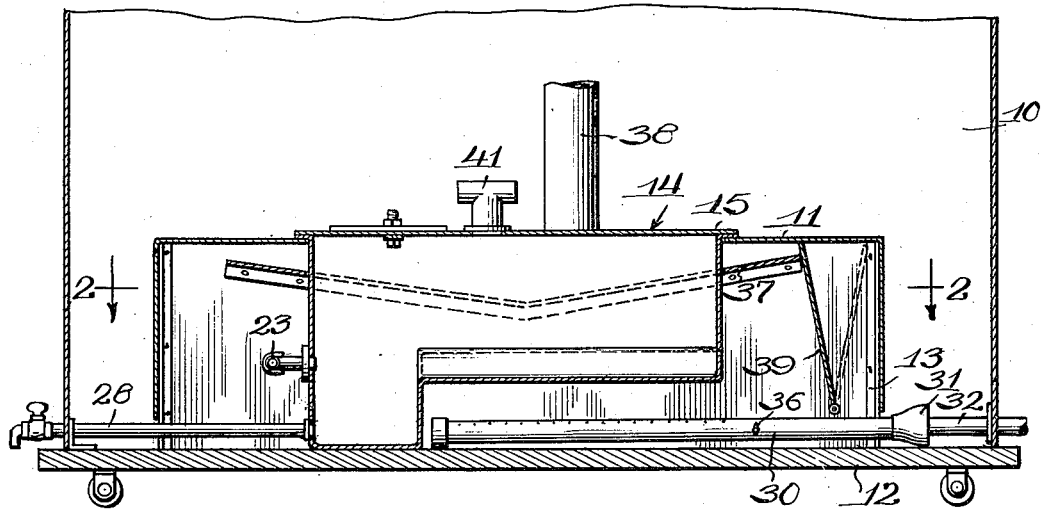
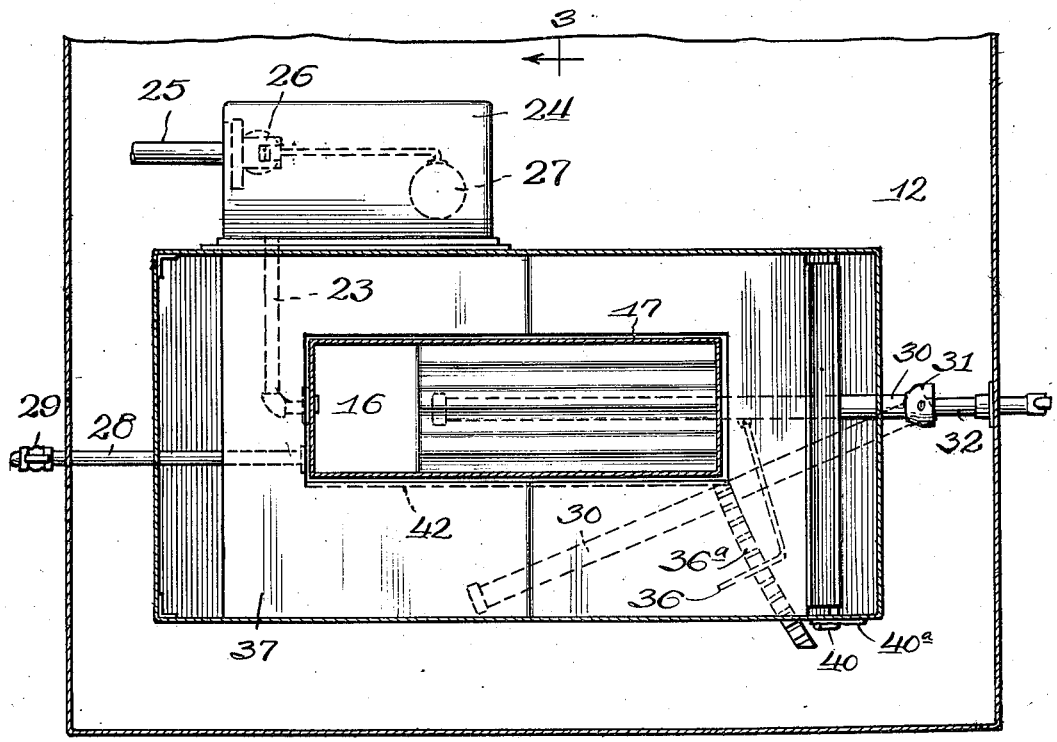

July 10, 1928. 1,676,763
F. A. ANETSBERGER ET AL
HUMIDIFYING APPARATUS
Filed Sept. 12, 1927 3 Sheets-Sheet 3
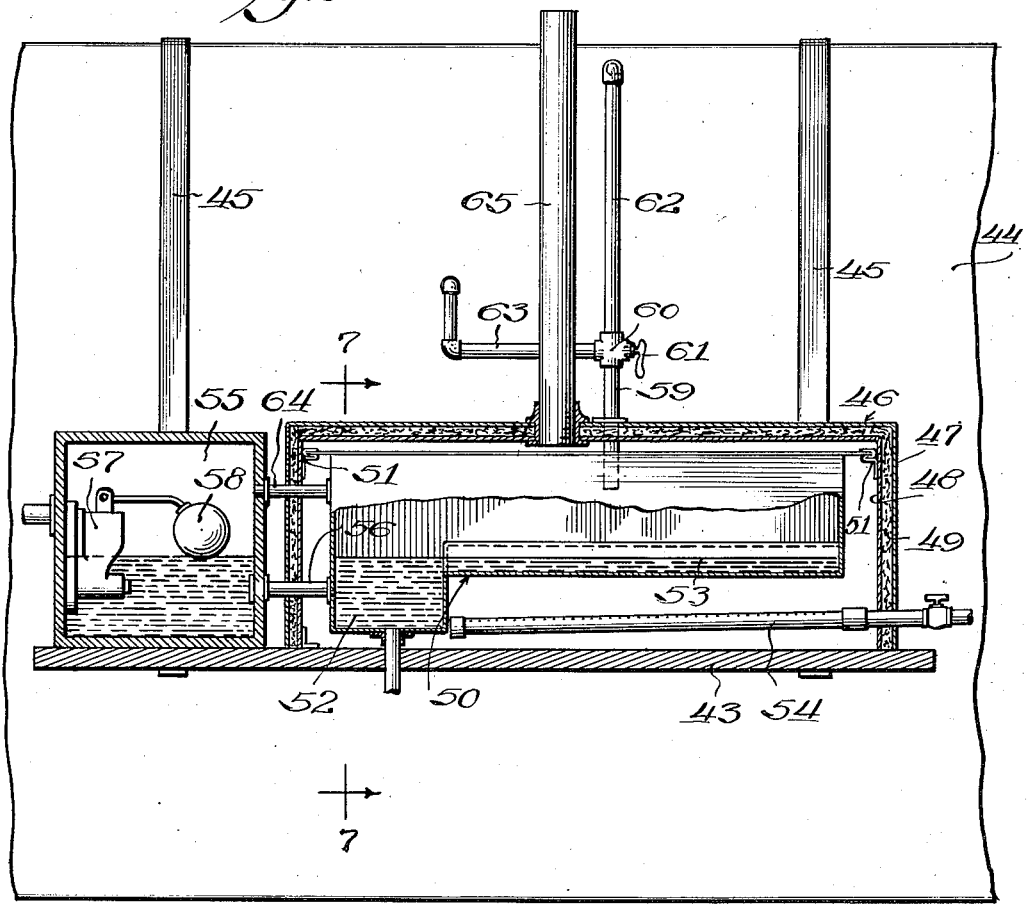
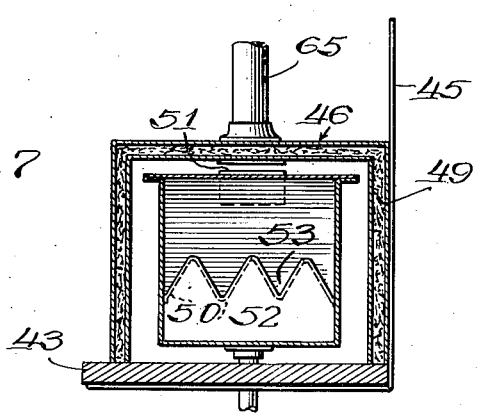
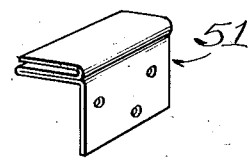

Patented July 10, 1928.

1,676,763

UNITED STATES PATENT OFFICE.

FRANK A. ANETSBERGER AND WILLIAM ANETSBERGER, OF CHICAGO, ILLINOIS.

HUMIDIFYING APPARATUS.

Application filed September 12, 1927. Serial No. 219,153.

This invention relates to improvements in humidifying apparatus.

The principal object of the invention is to provide an improved humidifying apparatus which is particularly adapted for use with bakers' equipment, such as baking ovens and proof boxes. An additional object is to provide an improved vapor or steam generating receptacle or tank, by the use of which steam can be generated in a relatively short time and one which can be economically manufactured. Other objects relate to various features of construction and arrangement of parts, which will become apparent from a consideration of the following specification and accompanying drawings wherein.

Fig. 1 is a vertical section taken longitudinally through one form of our improved humidifying apparatus, the apparatus being shown installed in a proofing box;

Fig. 2 is a horizontal section taken on line 2—2 of Fig. 1.

Fig. 3 is a transverse vertical sectional view, taken on line 3—3 of Fig. 2.

Fig. 4 is a perspective view of a vapor generating receptacle shown detached from the remainder of the apparatus.

Fig. 5 is an enlarged detail view of an adjustable burner.

Fig. 6 is a broken view partly in section of a modification of the invention.

Fig. 7 is a transverse sectional view taken on line 7—7 of Fig. 6, and

Fig. 8 is a perspective view of a supporting bracket.

In bakers' proof boxes in which the bread dough is placed during the rising thereof, it is usually necessary to employ a heating and humidifying device for maintaining the desired conditions.

In Fig. 1 a proof box 10 of any suitable construction is shown upon the floor of which is one form of the humidifying apparatus forming the subject matter of the present improvements.

The apparatus comprises an outer casing 11 having an open bottom, but closed on the remaining sides and being supported a suitable distance above the floor 12 of the proof box by legs 13. A vapor generator, indicated generally by the numeral 14, is suitably supported within the casing 11. In the form shown the top of the casing 11 has an opening therein through which the generator 14 is inserted, the generator having a flanged top 15, which engages and rests upon the perimeter of the opening. The generator 14, as shown in Fig. 4, comprises preferably a sheet metal receptacle having a well portion 16 and a longitudinal heating or vaporizing portion or chamber 17, the bottom of the latter being of saw-tooth like construction in cross section. The top 15 of the generator may be welded or soldered thereto and is preferably provided with an inspection opening 18 above the well 16, which opening is normally closed by a plate 19. The plate may be held in closing position by any suitable means such as by a bar 20, which spans the opening transversely on the interior of the receptacle, and co-acts with the tightening bolt and nut 21 and 22 respectively on the outside of the plate. When it is desired to remove the plate for cleaning the sediment or other deposits from the well or for other purposes, the nut 22 is loosened sufficiently to permit the bar 21 to be turned to such position that it can be withdrawn through the opening 18. A water inlet 23 supplies the well of the receptacle with water up to such a level that the channels in the generating portion 17 of the receptacle will be about half full, that is, the water level will lie between the upper and lower bends of the channel forming corrugations. The pipe 23 communicates with the water reservoir 24, which in turn is connected by pipe 25 with any suitable source of water supply. An automatic shut off valve 26 of any suitable construction is provided in the reservoir 24, which valve is opened and closed by means of a float 27 in a well known manner to preserve the water at the desired predetermined level. A drain pipe 28 is provided adjacent the bottom of the well 16 and may be provided with a suitable cock 29, whereby the water may be drained from the generator when desired.

A gas burner 30 extends under the tooth-like bottom of the vapor generating portion of the member 14, as shown in Fig. 1. The burner 30 has an enlarged end 31 into which the gas conductor 32 projects. The conductor 32 has its outlet end reduced as by plugging the end and boring a passage 33 therethrough, so that the quantity of gas flowing through the passage is proportioned correctly with reference to the air inlet 34. Suitable pins 35 project through the member 31 into suitable sockets or recesses formed in the pipe 32 whereby the burner 30 can be adjusted horizontally as indicated by the dotted lines in Fig. 2. In the use of the equipment in proof boxes it is frequently necessary to adjust the burner to the dotted line position to prevent further generation of vapor, but to still utilize the burner for the purpose of generating dry heat. A suitable handle 36 is provided for effecting the adjustment mentioned, the handle sliding over a graduated strap 36ª for indicating the position of the burner with reference to the bottom of the channeled bottom of the vaporizing chamber.

A heat spreader is provided in the casing 11 in the form of a transverse plate 37 secured to the side walls of the casing. The spreader is provided with a central opening through which the member 14 passes and inclines upwardly from the center to carry the heat toward the ends of the casing 11. The heated air passes around the ends of the spreader 37 and heats the walls of the casing and finally passes, together with the products of combustion, upwardly through the exhause pipe 38, which extends to a point exterior of the proof box 10. It will be seen that the well portion 16 of the vapor generator partly obstructs the flow of heated air to the adjacent end of the casing 11 and to prevent the uneven distribution of heat within the casing a damper 39 is provided which extends transversely of the casing 11, as shown in Fig. 1 and may be rocked by means of a handle 40 from the dotted line to the full line position shown in Fig. 1 or to any intermediate position, thereby effecting a suitable distribution of heat within the casing 11. A portion of the handle bears against a friction retainer member 40ª whereby the damper is held in any desired position. The vapor generated within the member 14 passes into the proof box 10 through an exhaust member 41, which is preferably in the form of a T having two oppositely disposed outlet openings which direct the steam away from the center of the proof box to effect a more uniform distribution thereof.

When it is desired to provide a dry heat only for the proof box, the burner 30 is moved to the position shown by dotted lines in Fig. 2 and while in this position the member 14 is protected from the heat by the shield 42 which is formed by bending down a portion of the spreader 37 which is cut out to form the opening through which the member 14 extends. The shield may be insulated if desired.

The form of the invention shown in Fig. 6 is particularly adapted for use in connection with bakers' ovens. It is usually necessary to provide some means for supplying steam or vapor to the oven for humidifying purposes and the apparatus shown in Fig. 6 is adapted for use on ovens not otherwise provided with suitable steam connections. The apparatus is mounted on a base 43, which may be supported by any suitable means adjacent an oven. In Fig. 6 we have shown the base 43 as being supported above the floor against the side of an oven 44 by means of a pair of hangers 45. Supported on the base 43 is a casing indicated generally by numeral 46 consisting of an outer sheet metal structure 47 and inner structure 48 between which suitable insulating material 49, such as asbestos, is provided. A vapor generator 50 similar to that shown in Fig. 4 is supported within the casing 46 by means of suitable brackets 51 shown in detail in Fig. 8. These brackets engage the end flanges of the top of member 50 and support the same in spaced relation with reference to the casing 46. Member 50 has a well portion 52 and a corrugated or channelled heating portion 53, and beneath the latter is positioned a gas burner 54. A water tank or reservoir 55 communicates through pipe 56 with the well 52 and by means of the shut-off valve 57 controlled by float 58 the level of the water in the member 50 is regulated. A pipe 59 is shown extending from the top of the generator 50 and provided with a three-way valve 60 having an operating handle 61. Extending from the valve 60 is a pipe 62 which goes to the upper baking compartment of oven 44 and extending from the other opening of the valve is pipe 63 which carries vapor to the lower baking compartment of the oven. The valve 60 is of a standard construction and is so constructed that steam can always pass through the valve, either to pipe 62 or 63 or to both of said pipes. In other words it is not possible to close the valve against the passage of steam from the member 50. Where the device is used with an oven having a single baking compartment, only one steam conveyor pipe will be used, and no valve will be required.

It is sometimes desirable to conduct steam a considerable distance from the generator 50 and in such cases the back pressure of the steam through the long conductors might be sufficient to force the water in the member 50 back through pipe 56 into the reservoir 55. This would, of course, cause the generator 50 to become dry with resulting damage to the same. To prevent such back flow of water from the generator to the reservoir, we have provided a steam by-pass or pressure equalizing connection in the form of pipe 64 connecting the member 50 with the reservoir 55 above the normal water level. By means of this connection the steam can pass into the reservoir and thus prevent the displacement of water from the generator, as will be obvious.

The generator 50, as shown in Fig. 7 is spaced on all sides from the casing 46 thus permitting the heated air and products of combustion to pass around the same and over the top thereof to the exhaust pipe 65.

By constructing the generator shown in Fig. 4 and the generator 50 shown in Fig. 6 in the manner above described and by using therewith the relatively long gas burners disclosed, the rapid generation of vapor is possible, and without the necessity of heating a relatively large volume of water. As will be seen the corrugated bottom retains the water in the form of narrow bands which have a large surface exposure to the heat. The upper extremities of the corrugations become very hot and assist in the heating of the vapor as it rises from the channels. The construction has proven to be very efficient, is cheaper to manufacture than a coil construction and can be cleaned more readily. The well of the generator, which communicates with each of the longitudinal channels of the corrugated bottom keeps a definite quantity in each channel at all times and prevents the same from burning dry. As the water is consumed an automatic control in the tank 24 of Fig. 2 or of tank 55 of Fig. 6 supplies additional water to the wells through the communicating pipes 23 or 56 respectively.

Although we have shown certain features of our invention for the purpose of illustration, it will be apparent that various changes may be made therein without departing from the spirit of the invention and we do not wish to be restricted to the specific embodiments shown and described except as limited thereto by the appended claims.

What we claim is:

1. Apparatus of the class described comprising a casing, a vapor generating receptacle therein having a vapor outlet, said receptacle being provided with a well and a communicating channelled bottom portion, a burner beneath said bottom, means for supplying water to said well, and means for maintaining water in the well and channels at a level intermediate the upper and lower extremities of the latter.

2. Apparatus of the class described comprising a casing, a vapor generating receptacle within said casing having a vapor outlet, said receptacle being provided with a well and a channelled bottom portion, a burner in said casing beneath said bottom, a water reservoir communicating with said well, and means in said reservoir for controlling the level of water in said well and in the channels of said bottom.

3. Apparatus of the class described comprising a casing, a vapor generating receptacle therein, said receptacle comprising a well and a laterally disposed vaporizing chamber, said chamber having a bottom provided with longitudinal channels each communicating with said well, a burner associated with said bottom, and a vapor outlet for said receptacle.

4. Apparatus of the class described comprising a vapor generating receptacle provided with a well and a laterally extending vaporizing chamber having a vapor outlet, said chamber having extended water holding members each disposed in a plane higher than the bottom of said well, each of said members communicating with said well and being adapted to be supplied with water therefrom, said receptacle having an inspection opening, a member normally closing the same, and a burner disposed beneath said extended water holding members.

5. Apparatus of the class described comprising a casing, a vapor generating receptacle in said casing, a heat spreader around said receptacle, said spreader extending from said receptacle to the side walls of said casing but terminating short of the ends of the latter, a shield extending vertically downward from said spreader adjacent one side of said receptacle, and a burner in said casing beneath said receptacle, said burner being adjustable horizontally from a position beneath said receptacle to a position wherein said shield lies between the burner and the receptacle, said spreader being adapted to deflect the heated air and products of combustion towards the ends of said casing in either position of adjustment of said burner, said spreader being spaced from the top wall of said casing to provide an upper passage from the ends of said spreader, and an exhaust pipe extending from said passage.

6. Apparatus of the class described comprising a vaporizing receptacle and a heating device therebeneath, said device comprising a stationary gas conduit having a reduced opening, a perforated burner member having an end spaced concentrically around the outlet end of said conduit to provide an air inlet and a pair of pins connecting said burner and conduit, said pins being disposed in the vertical diameter of said burner to permit of the horizontal adjustment of the same.

7. A vapor generating receptacle comprising a sheet metal enclosure having a well portion and a laterally extending vaporizing chmber, said chamber having a bottom provided with channels extending longitudinally thereof and each communicating with said well, said receptacle having an inspection opening in the top thereof above said well, and a member normally closing the opening.

8. Apparatus of the class described comprising a vaporizing receptacle, a heating device therebeneath, said device comprising a stationary fuel conduit having a reduced outlet opening, a burner member having an end spaced concentrically around the outlet end of said conduit to provide an air inlet and pivoting means securing said burner to the end of said conduit to permit of the adjustment of the burner relatively to said receptacle.

In testimony whereof, we have subscribed our names.

FRANK A. ANETSBERGER.
WILLIAM ANETSBERGER.